(12) United States Patent
Yuzawa et al.

(10) Patent No.: US 9,833,854 B2
(45) Date of Patent: Dec. 5, 2017

(54) WORKPIECE RETAINER, WIRE ELECTRIC DISCHARGE MACHINING DEVICE, THIN-PLATE MANUFACTURING METHOD, AND SEMICONDUCTOR-WAFER MANUFACTURING METHOD

(75) Inventors: Takashi Yuzawa, Tokyo (JP); Hidetaka Miyake, Tokyo (JP); Tatsushi Sato, Tokyo (JP); Atsushi Itokazu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 513 days.

(21) Appl. No.: 13/695,716

(22) PCT Filed: Mar. 23, 2011

(86) PCT No.: PCT/JP2011/057048
§ 371 (c)(1),
(2), (4) Date: Nov. 1, 2012

(87) PCT Pub. No.: WO2011/145390
PCT Pub. Date: Nov. 24, 2011

(65) Prior Publication Data
US 2013/0043217 A1 Feb. 21, 2013

(30) Foreign Application Priority Data
May 18, 2010 (JP) .................................. 2010-113965

(51) Int. Cl.
*B23H 1/02* (2006.01)
*B23H 7/04* (2006.01)
(Continued)

(52) U.S. Cl.
CPC ............. *B23H 11/003* (2013.01); *B23H 7/02* (2013.01); *B23H 9/00* (2013.01)

(58) Field of Classification Search
CPC ........ B23H 7/02; B23H 9/005; B23H 11/003; B23Q 3/00
(Continued)

(56) References Cited

U.S. PATENT DOCUMENTS 4,193,852 A  3/1980 Inoue
4,288,675 A *  9/1981 Inoue ....................... B23H 7/18
219/69.13
(Continued)

FOREIGN PATENT DOCUMENTS

JP   54 20485    2/1979
JP   2 231110    9/1990
(Continued)

OTHER PUBLICATIONS

International Search Report dated Apr. 19, 2011 in PCT/JP11/57048 Filed Mar. 23, 2011.
U.S. Appl. No. 14/702,409, filed May 1, 2015, Miyake, et al.

*Primary Examiner* — Dana Ross
*Assistant Examiner* — Lawrence Samuels
(74) *Attorney, Agent, or Firm* — Oblon, McClelland, Maier & Neustadt, L.L.P.

(57) ABSTRACT

A workpiece retainer retains a workpiece at a time of a cutting process by a wire electric discharge machining device that cuts a workpiece by electric discharge from wire electrodes that are spaced from each other and are arranged in parallel. The workpiece retainer is formed with a fitting portion, into which the workpiece is fitted substantially without any gap, and has an external shape such that at a time of cutting the workpiece retainer together with the workpiece fitted in the fitting portion, a length along the wire electrodes of a portion where the workpiece retainer and the workpiece face the wire electrodes becomes substantially constant during the cutting process of the workpiece.

3 Claims, 11 Drawing Sheets

(51) Int. Cl.
  *B23H 7/00* (2006.01)
  *B23H 7/02* (2006.01)
  *B23H 11/00* (2006.01)
  *B23H 9/00* (2006.01)

(58) Field of Classification Search
  USPC .......................................... 219/69.11–69.2
  See application file for complete search history.

(56) References Cited

U.S. PATENT DOCUMENTS

| | | | | |
|---|---|---|---|---|
| 4,438,312 | A | * | 3/1984 | Inoue .......................... 219/69.12 |
| 4,581,513 | A | * | 4/1986 | Obara ................... B23H 7/101 204/206 |
| 4,594,498 | A | * | 6/1986 | Ueguri ................... B23K 9/091 219/130.21 |
| 5,117,082 | A | * | 5/1992 | Bosson ................. B23H 7/065 219/69.12 |
| 5,122,630 | A | * | 6/1992 | Reynier ................. B23H 7/101 219/69.12 |
| 5,362,936 | A | * | 11/1994 | Ishibashi et al. .......... 219/69.12 |
| 5,499,801 | A | * | 3/1996 | Nakazawa et al. .......... 269/48.1 |
| 5,715,807 | A | * | 2/1998 | Toyama et al. ............ 125/16.02 |
| 5,824,986 | A | * | 10/1998 | Derighetti ................ B23H 7/06 219/69.12 |
| 5,893,308 | A | * | 4/1999 | Katamachi et al. .............. 83/13 |
| 5,937,844 | A | * | 8/1999 | Kiuchi ................. B28D 5/0064 125/16.02 |
| 6,295,977 | B1 | * | 10/2001 | Ripper et al. ............ 125/16.02 |
| 7,145,096 | B2 | * | 12/2006 | Sakurai et al. ............ 219/69.13 |
| 2005/0115929 | A1 | * | 6/2005 | Sakurai et al. ............ 219/69.13 |
| 2008/0277383 | A1 | * | 11/2008 | Sandlin .................... B23H 1/10 219/69.12 |
| 2010/0133237 | A1 | * | 6/2010 | Onodera ................ B23H 1/022 219/69.13 |
| 2011/0092053 | A1 | * | 4/2011 | Miyake et al. ............... 438/460 |

FOREIGN PATENT DOCUMENTS

| | | |
|---|---|---|
| JP | 5 293711 | 11/1993 |
| JP | 5 309526 | 11/1993 |
| JP | 2689472 | 12/1997 |
| JP | 2765307 | 6/1998 |
| JP | 2000 109397 | 4/2000 |
| JP | 2001 138155 | 5/2001 |
| JP | 2006 123055 | 5/2006 |

* cited by examiner

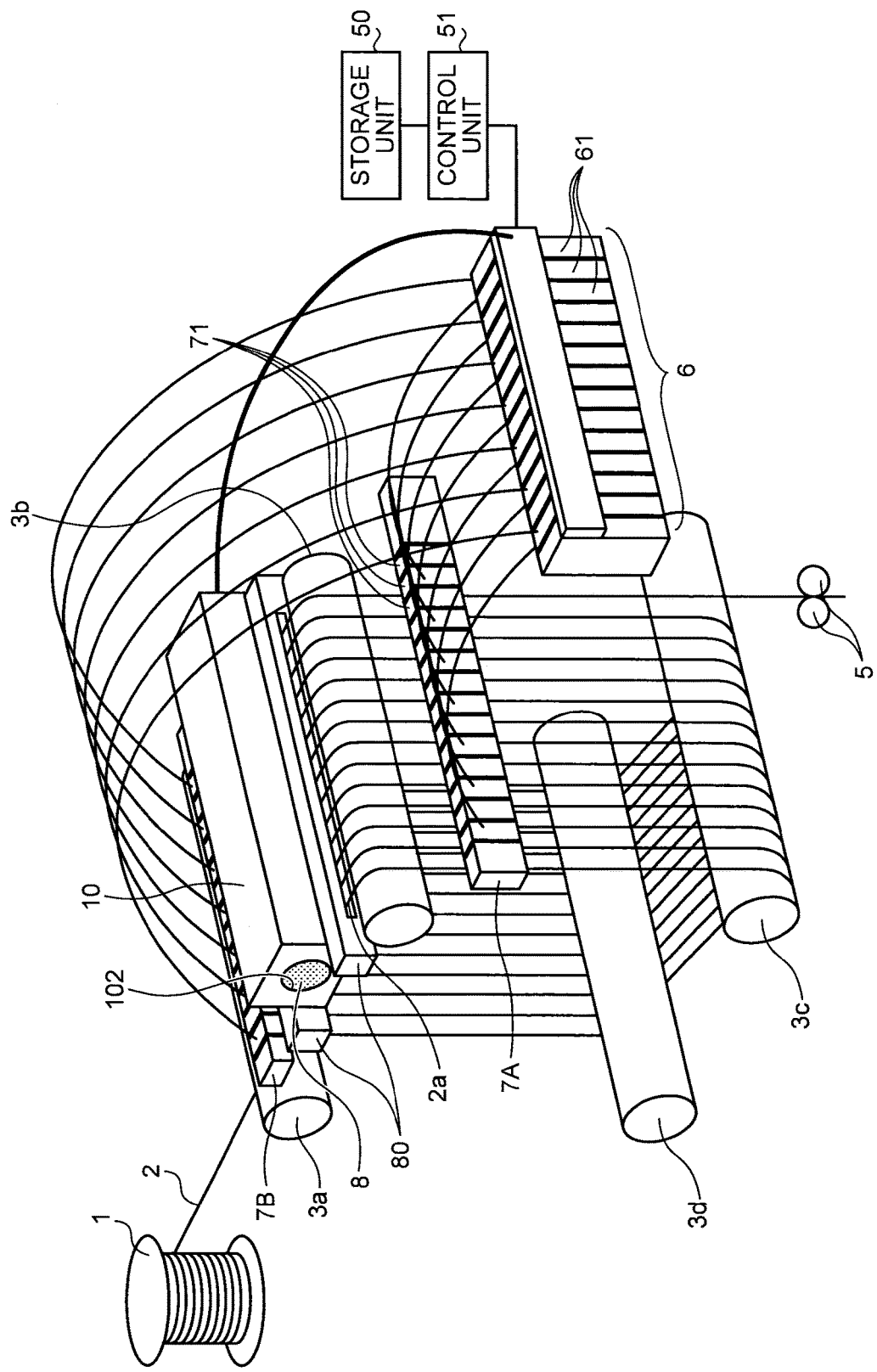

IMMEDIATELY AFTER
START OF MACHINING

IMMEDIATELY BEFORE
COMPLETION OF MACHINING

PENETRATED SHAPE

HORIZONTALLY DIVIDED SHAPE

LONGITUDINALLY DIVIDED SHAPE

FALL PREVENTING LID

FALL PREVENTING FIXING SCREW

WORKPIECE RETAINER, WIRE ELECTRIC DISCHARGE MACHINING DEVICE, THIN-PLATE MANUFACTURING METHOD, AND SEMICONDUCTOR-WAFER MANUFACTURING METHOD

FIELD

The present invention relates to a workpiece retainer, a wire electric discharge machining device, a thin-plate manufacturing method, and a semiconductor-wafer manufacturing method.

BACKGROUND

Conventionally, as a wire electric discharge machining method, there is proposed a discharge wire-saw method in which, when a thin plate is sliced from a workpiece having a columnar shape, a wire electrode is wound between a plurality of guide rollers and arranged in parallel to form multiple cut wire portions, power is fed individually to each cut wire portion so that electric discharge occurs between each cut wire portion and the workpiece, thereby cutting the workpiece into a plurality of pieces at a time.

In the discharge wire-saw having the configuration described above, retaining means for reliably retaining the workpiece is required to perform machining stably. For example, Patent Literature 1 discloses a technique in which a conductive fixing base extending in an axial direction is prepared in a part of a columnar workpiece in a circumferential direction, and the fixing base and the workpiece are fixed by an adhesive having electrical conductivity, that is, a technique for retaining the workpiece by the fixing base.

Furthermore, Patent Literature 2 discloses a technique in which, in a multi wire-saw that supplies a machining fluid including abrasive grains to a portion between a wire and a workpiece and cuts multiple wafers by an abrasive action, while pressing the workpiece against a plurality of wire lines, a workpiece is mounted on a dummy member having an L-shaped cross section, and cutting is performed together with the dummy member, while supporting a grinding resistance acting on a portion to be cut by a side portion of the dummy member. Patent Literature 2 describes that setting of the workpiece and removal of the workpiece after cutting are efficiently performed according to this method.

Further, Patent Literature 3 discloses a technique in which, when different materials of a workpiece having a composite structure manufactured by combining different materials having a difference in hardness are simultaneously cut or ground, an inside edge of a material to be cut having high hardness or brittleness is chamfered in advance to generate a groove in an interface with another material, thereby performing simultaneous-cutting, cutting, or grinding highly accurately without damaging a blade.

CITATION LIST

Patent Literatures

Patent Literature 1: Japanese Patent Application Laid-open No. 2000-109397

Patent Literature 2: Japanese Patent No. 2765307

Patent Literature 3: Japanese Patent Application Laid-open No. H5-293711

SUMMARY

Technical Problem

In the discharge wire-saw method described above, a discharge state during a cutting process needs to be maintained stably. If the discharge state is destabilized, a short circuit occurs between a wire and a workpiece, and a machining surface may be damaged or wire breakage may occur. A damage of the machining surface and the wire breakage lead to manufacturing a faulty product, and thus these problems need to be avoided to improve productivity.

Meanwhile, when a columnar workpiece is to be cut, the length (a facing length) of a portion where a wire and a workpiece face each other along the wire changes with the progress of the cutting process. That is, the facing length increases most at the time of cutting a center of the columnar workpiece, and the facing length decreases as being away from the center. Due to the change in the facing length, the discharge state during the cutting process cannot be maintained stably.

Generally, to realize a maximum speed in wire electric discharge machining, an optimum condition needs to be set for each machining plate thickness. However, because there is the change in the facing length described above, the machining condition needs to be set based on a plate thickness condition at the time of starting the cutting process, at which the discharge state is likely to be unstable. Therefore, there is a problem that the machining speed throughout the whole workpiece tends to decrease, thereby causing an increase in a machining time.

Because a machining gap changes with the change in the facing length, it becomes difficult to maintain a machining groove width constant. Generally, a state where the machining groove width has changed is referred to as "machined surface waviness", and a waved portion needs to be removed reliably by a polishing operation in a subsequent process. Therefore, because a machining pitch needs to be set large in anticipation of an elimination quantity at the time of polishing, wafer yield per one ingot decreases, thereby deteriorating the productivity.

Furthermore, to discharge machining chips generated due to machining from the machining groove, machining chips may be discharged by injecting machining fluid from a machining fluid nozzle installed close to the workpiece toward the machining groove. However, in order to arrange the machining fluid nozzle close to the workpiece, the machining fluid nozzle needs to be moved matched with the change of the facing length described above, thereby causing complication of the apparatus. In addition, when the machining fluid nozzle cannot be arranged close to the workpiece, wire breakage is likely to occur. Therefore, the machining has to be that with low energy with which wire breakage hardly occurs, and thus it is reduced to be low-speed machining.

In addition, according to the techniques disclosed in Patent Literatures 1 to 3, it is difficult to suppress a change in the facing length at the time of cutting a columnar workpiece.

The present invention has been achieved to solve the above problems, and an object of the present invention is to provide a workpiece retainer that can suppress a change in a facing length between a wire electrode and a workpiece and stably maintain a discharge state during a cutting process by a wire electric discharge machining device. Another object of the present invention is to realize highly accurate groove machining by machining a workpiece by a machining power source that can change a pulse frequency according to a facing length between a single workpiece and a wire electrode.

Solution to Problem

In order to solve the above problem and in order to attain the above object, a workpiece retainer of the present invention retains a workpiece at a time of a cutting process by a wire electric discharge machining device that cuts a workpiece by electric discharge from wire electrodes that are spaced from each other and are arranged in parallel. The workpiece retainer is formed with a fitting portion, into which the workpiece is fitted substantially without any gap. The workpiece retainer has an external shape such that at a time of cutting the workpiece retainer together with the workpiece fitted in the fitting portion, a length along the wire electrodes of a portion where the workpiece retainer and the workpiece face the wire electrodes becomes substantially constant during the cutting process of the workpiece.

Furthermore, in the workpiece retainer that retains a workpiece, at the time of cutting the fitting portion together with the workpiece fitted therein, a machining power source for cutting can change its pulse frequency according to a facing length W between a workpiece and wire electrodes.

Advantageous Effects of Invention

According to the present invention, a discharge state during a cutting process by the wire electric discharge machining device can be stably maintained, and a groove width can be maintained uniformly, regardless of the change in the facing length W between a workpiece and wire electrodes.

BRIEF DESCRIPTION OF DRAWINGS

FIG. 1 is a perspective view of a configuration of a wire electric discharge machining device according to a first embodiment of the present invention.

FIG. 4-1 is a perspective cross section of a relation between a workpiece and a workpiece retainer, and a wire electrode during a cutting process.

FIG. 4-2 is a horizontal cross section of a relation between the workpiece and the workpiece retainer, and the wire electrode during a cutting process.

FIG. 5-1 depicts a positional relation between a workpiece retainer and machining fluid nozzles during a cutting process, and depicts a state immediately after start of machining.

FIG. 5-2 depicts a positional relation between the workpiece retainer and the machining fluid nozzles during a cutting process, and depicts a state immediately before completion of machining.

FIG. 6-1 is a perspective view of a workpiece retainer according to a first modification of a first embodiment.

FIG. 6-2 is a perspective view of a workpiece retainer according to a second modification of the first embodiment.

FIG. 6-3 is a perspective view of a workpiece retainer according to a third modification of the first embodiment.

FIG. 7-1 is a perspective view of a workpiece retainer, depicting an example of a fall preventing structure of a workpiece.

FIG. 7-2 is a perspective view of a workpiece retainer, depicting an example of the fall preventing structure of a workpiece.

FIG. 10-1 is a horizontal cross section of a relation between the workpiece and the workpiece retainer, and the wire electrode during the cutting process in the third embodiment.

FIG. 10-2 is a horizontal cross section of a relation between the workpiece and the workpiece retainer, and the wire electrode during the cutting process in the third embodiment.

DESCRIPTION OF EMBODIMENTS

Exemplary embodiments of a workpiece retainer, a wire electric discharge machining device, a thin-plate manufacturing method, and a semiconductor-wafer manufacturing method according to the present invention will be explained below in detail with reference to the accompanying drawings. The present invention is not limited to the embodiments.

First Embodiment

Figures 1, 4:
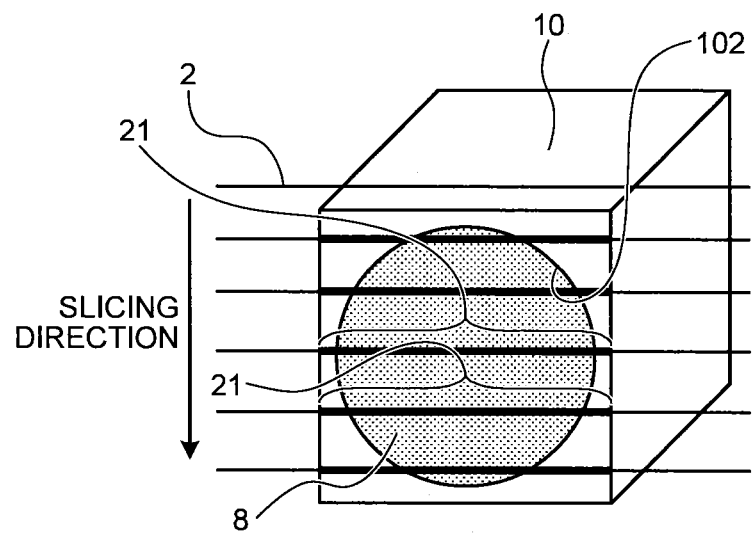
Figures 2, 4:
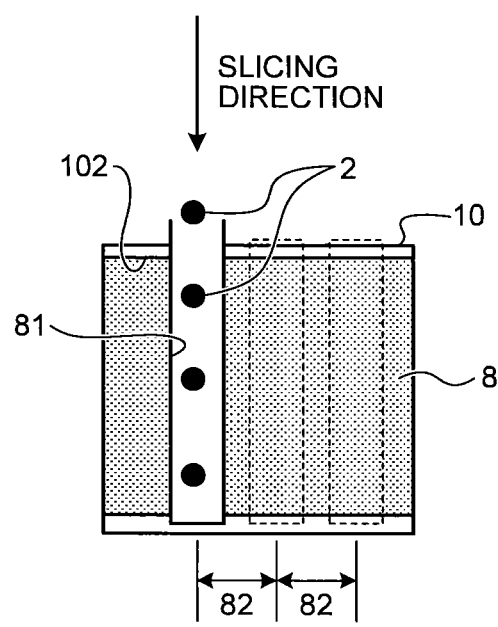

FIG. 1 is a perspective view of a configuration of a wire electric discharge machining device according to a first embodiment of the present invention. Four guide rollers 3a to 3d are spaced from each other and are arranged parallel to each other in an axial direction. A wire electrode 2 unreeled from a wire bobbin 1 is sequentially wound between the guide rollers 3a to 3d more than once with a minimal gap in between each other, and is discharged from a wire discharge roller 5. A part of the wire electrode 2 laid across between the guide rollers 3a and 3b in a tensioned state parallel to each other becomes a cutting wire portion 2a.

A workpiece retainer 10 that retains a workpiece 8 is arranged opposite to the cutting wire portion 2a and away from the cutting wire portion 2a by a minute distance by a position controller (not shown). As shown in FIG. 1, machining fluid nozzles 80 are arranged close to the workpiece retainer 10 away by about 100 micrometers to supply machining fluid into a machining groove. A machining power supply 6 is connected to the cutting wire portion 2a via power feed contacts 7A and 7B to apply a voltage between the cutting wire portion 2a and the workpiece 8 that is away from each other by a minute distance and generate electric discharge.

The cutting wire portion 2a is constituted by wires laid across between the guide rollers 3a and 3b in a tensioned state parallel to each other. The machining power supply 6 is formed of a plurality of machining power-supply units 61 insulated from each other. The power feed contacts 7A and 7B are also formed of a plurality of power feed contact units 71 insulated from each other. Power is fed to each cutting wire portion 2a from each corresponding machining power-supply unit 61 via each power feed contact unit 71 to form a state where a voltage can be applied to each cutting wire independently. The polarity of applying a voltage by the machining power supply 6 can be appropriately reversed as required, as in the conventional wire electric discharge machining device.

As described above, because the position of the workpiece retainer 10 that retains the workpiece 8 is always controlled by a position controller (not shown) with a minute gap to maintain appropriate electric discharge gap with the cutting wire portion 2a, the workpiece 8 is gradually fed in a direction of the cutting wire portion 2a and the machined groove becomes deep as the machined groove is formed by electric discharge, and is eventually cut in a thin plate shape.

The workpiece 8 needs to be sliced into a plurality of thin plates, and for example, includes metals such as tungsten and molybdenum as a sputtering target, ceramics such as multicrystalline silicon carbide used as various structural members, semiconductor materials such as monocrystalline silicon and monocrystalline silicon carbide as a semiconductor device wafer, and solar battery materials such as monocrystalline and multicrystalline silicon as a solar battery wafer. Metals of the materials mentioned above have a sufficiently low specific resistance, and there is no problem in application of electric discharge machining. The semiconductor materials and the solar battery materials that can be subjected to electric discharge machining are materials having a specific resistance of about 100 Ωcm or less, preferably 10 Ωcm or less.

Therefore, as the workpiece 8 according to the present invention, a metal or a material having a specific resistance in a range from an equivalent value of the metal to 100 Ωcm or less, preferably, 10 Ωcm or less, and particularly, the semiconductor material and the solar battery material having a specific resistance in the above range are preferable. In the example in FIG. 1, an example in which one wire electrode 2 is wound around four guide rollers is shown. However, the present invention is not limited thereto, and specific configurations thereof are not particularly limited, as long as one wire electrode 2 constitutes a plurality of cut wire portions.

The power feed contacts can be installed slightly away from the cutting wire portions 2a via the guide roller 3b as in the power feed contact 7A, or can be installed between the workpiece 8 and the guide roller 3a and near the workpiece 8 as in the power feed contact 7B.

Figure 2:
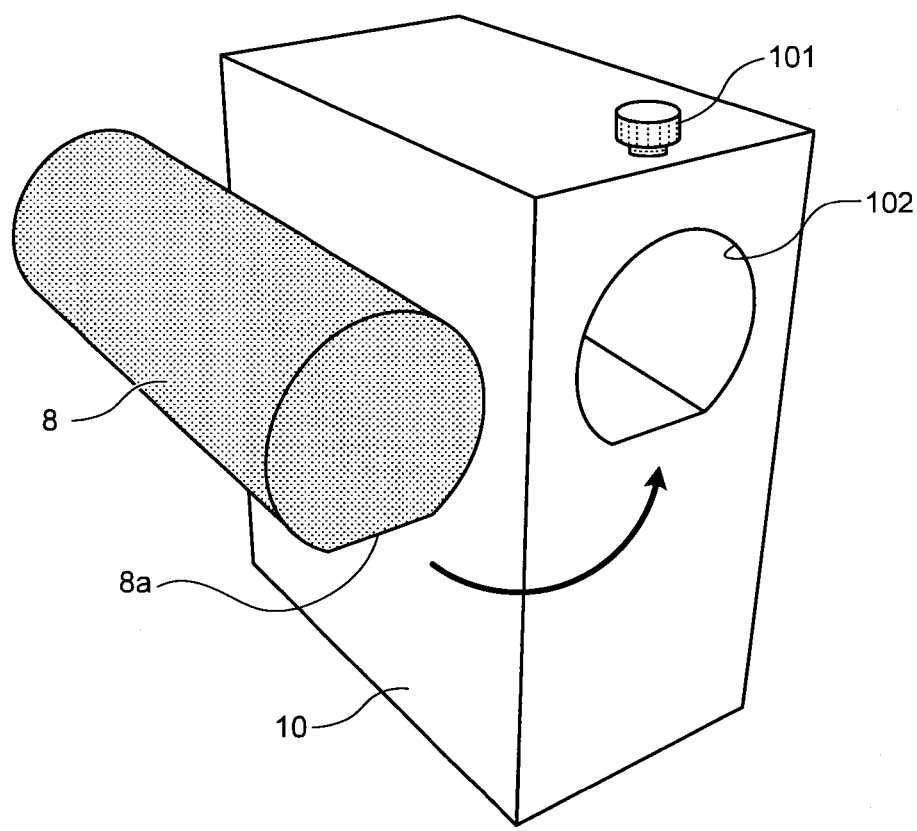
FIG. 2 is an explanatory diagram of a structure of a workpiece retainer.
Figure 3:
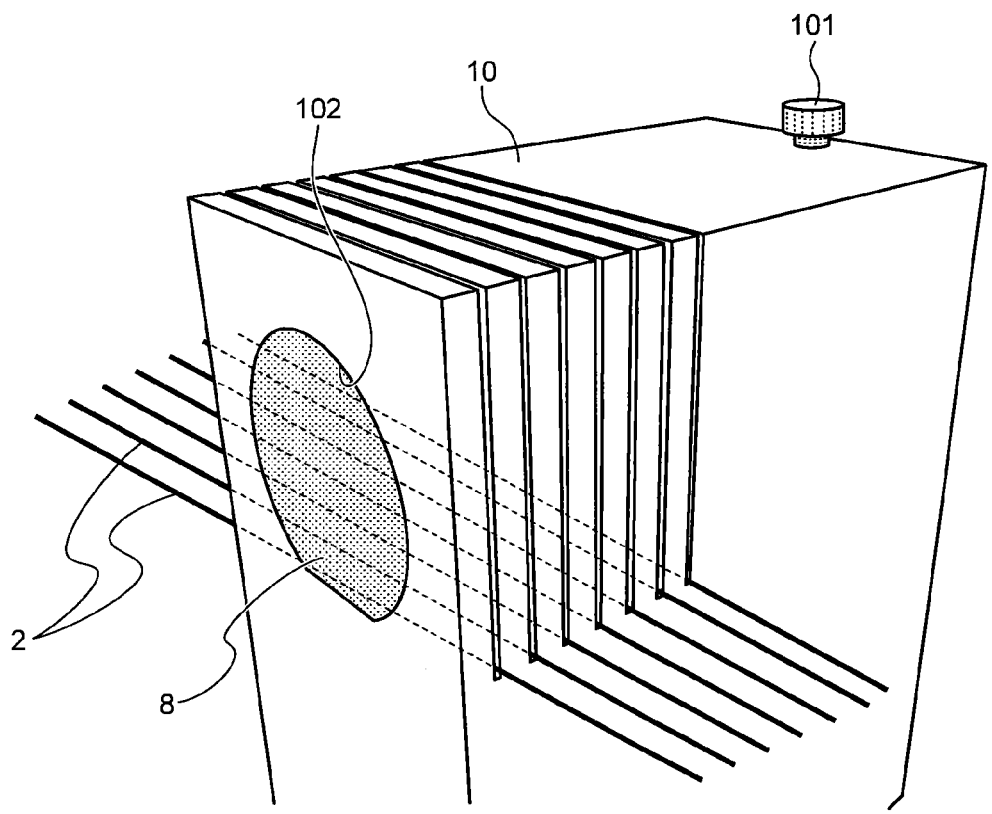
FIG. 3 is an explanatory diagram of a machined state of a workpiece.

The workpiece retainer 10 that retains the workpiece 8 is explained next. FIG. 2 is an explanatory diagram of a structure of the workpiece retainer 10. FIG. 3 is an explanatory diagram of a machined state of the workpiece 8.

When the workpiece 8 is a semiconductor material, a cylindrical ingot as shown in FIG. 2 is often used. The sectional shape thereof is not a circle to be precise, and in many cases includes a notch 8a, which is referred to as "orientation flat", so as to recognize its crystal directionality.

A fitting portion 102 for inserting the workpiece 8 is formed in the workpiece retainer 10. A workpiece in a cylindrical shape in cross section having the notch 8a can be fitted in the fitting portion 102 substantially without any gap. That is, a cross-sectional shape of the workpiece 8 and a cross-sectional shape of the fitting portion 102 are substantially the same. An example in which the notch 8a is arranged at the lowest end of the fitting portion 102 is shown in FIG. 2, by placing importance on the stability at the time of retaining the workpiece 8. However, the position of the notch on a circumference of the fitting portion 102 is not limited thereto. For example, a method of arranging a notch portion in the fitting portion 102 at a different position from a position at a stage of completing machining in order to reduce destabilization of machining immediately before completion of machining of the workpiece 8 can be considered. After the workpiece 8 is fitted in the workpiece retainer 10, the workpiece 8 can be fixed by a fixing screw 101 so that the position in a fit-in direction is not shifted. The fixing screw 101 is screwed into a screw hole penetrating from the side or the top of the workpiece retainer 10 toward the fitting portion 102, and protrudes to an inner periphery of the fitting portion 102 to fix the workpiece 8.

The workpiece retainer 10 is cut together with the workpiece 8 by the wire electric discharge machining device in a state of retaining the workpiece 8. That is, the workpiece retainer 10 is also made of a metal or a material having a specific resistance in a range from an equivalent value of the metal to 100 Ωcm or less, preferably, 10 Ωcm or less, as in the workpiece 8. While the material of the workpiece retainer 10 preferably has the same composition as that of the workpiece 8, a generally used structural material such as brass or an iron material can be used without any problem, taking economic efficiency into consideration.

FIG. 4-1 is a perspective cross section of a relation between the workpiece 8 and the workpiece retainer 10, and the wire electrode 2 during a cutting process. FIG. 4-2 is a horizontal cross section of a relation between the workpiece 8 and the workpiece retainer 10, and the wire electrode 2 during a cutting process. An external shape of the workpiece retainer 10 is a cuboid shape. Because the workpiece retainer 10 has a cuboid shape, as shown in FIG. 4-1, a facing length WJ 21 along the wire electrode 2 of a portion in which the workpiece retainer 10 and the workpiece 8 face the wire electrode 2 can be made substantially constant during the cutting process. In the following explanations, the facing length between the workpiece retainer including the workpiece and the wire electrode is assumed to be "facing length WJ", a facing length between a single workpiece and the wire electrode is assumed to be "facing length W", and a facing length between a single workpiece retainer and the wire electrode is assumed to be "facing length J".

Figures 1, 5:
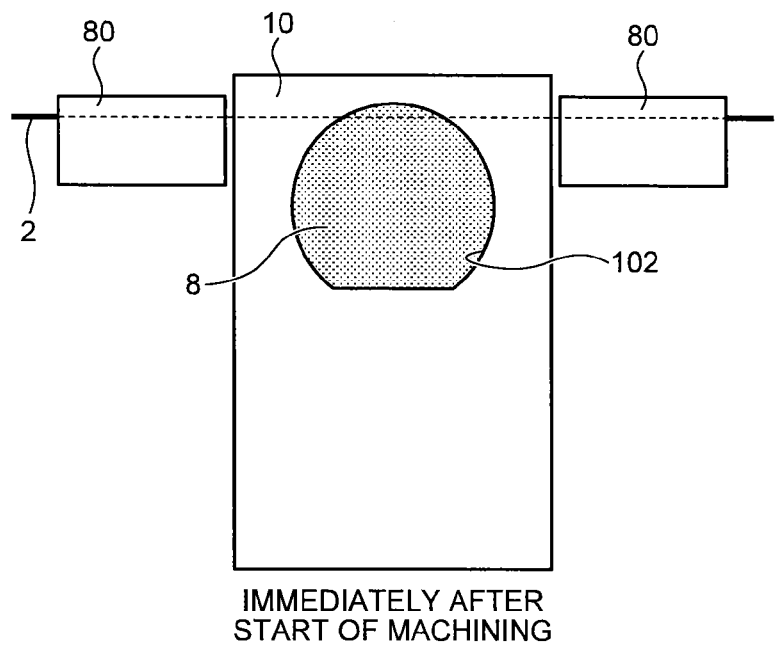
Figures 2, 5:
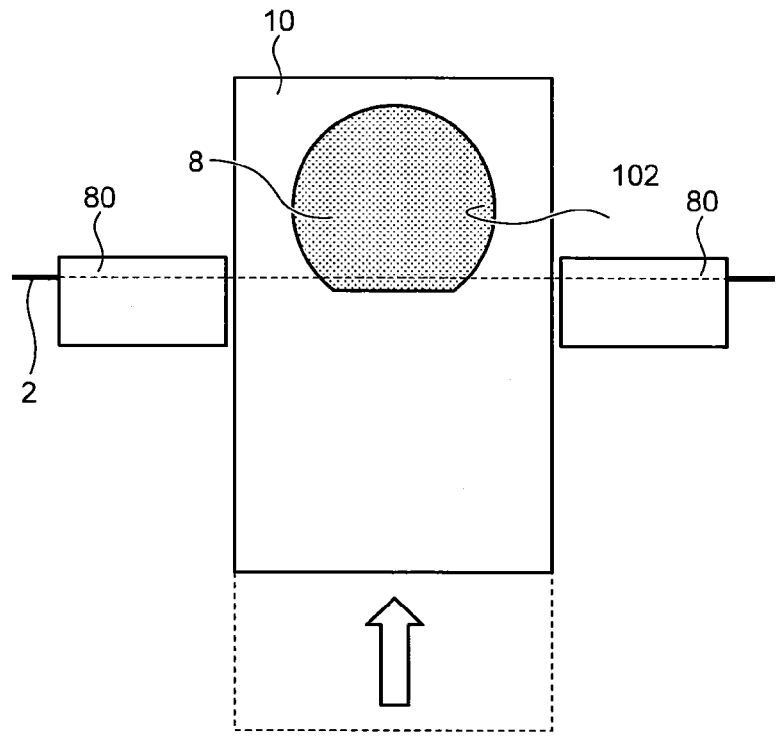

FIG. 5-1 depicts a positional relation between the workpiece retainer 10 and the machining fluid nozzles 80 during the cutting process, and depicts a state immediately after start of machining. FIG. 5-2 depicts a positional relation between the workpiece retainer 10 and the machining fluid nozzles 80 during the cutting process, and depicts a state immediately before completion of machining. Because the external shape of the workpiece retainer 10 is a cuboid shape, as shown in FIG. 5, a distance between the machining fluid nozzles 80 and the workpiece retainer 10 is unlikely to change, and a state where the machining fluid nozzles 80 and the workpiece retainer 10 are installed adjacent to each other is easily maintained regardless of the progress of the cutting process. The external shape of the workpiece retainer 10 is not limited to a cuboid shape. It is preferred that the external shape of the workpiece retainer 10 has a shape capable of setting the facing length substantially constant, particularly, during the cutting process of the two conditions described above.

In the wire electric discharge machining device described in the first embodiment, the workpiece 8 is fitted in the fitting portion 102 of the workpiece retainer 10, a pulsed machining voltage is applied to the wire electrode 2 via the power feed contact unit 71, and the workpiece retainer 10 that retains the workpiece 8 is fed toward the wire electrode 2, thereby cutting the workpiece 8 to manufacture thin plates. As the workpiece 8, a semiconductor wafer can be manufactured by using a semiconductor material.

As explained above, when the workpiece retainer 10 according to the present invention is used, the facing length WJ 21 between the wire electrode 2 and the workpiece 8 during the cutting process becomes substantially constant even when the cutting process progresses. Therefore, setting of machining conditions becomes easy, and conditions that can satisfy both of improvement of the machining speed and machining stability are easily determined. Furthermore, as shown in FIG. 4-2, because an interpolar state along with the progress of the cutting process is constant, a machining gap does not change, and a machining groove width (see FIG. 4-2) can be maintained substantially constant. Therefore, waviness on the machining surface can be minimized and it can be expected that a polishing amount in a polishing process, which is a post-process, can be minimized. Because a machining pitch width 82 can be decreased as an elimination quantity at the time of polishing decreases, a wafer yield per one ingot increases, thereby enabling to improve productivity.

As shown in FIGS. 5-1 and 5-2, even if the cutting process progresses, a state where the machining fluid nozzles 80 are close to the workpiece retainer 10 is maintained. Accordingly, the machining fluid is circulated in the machining groove to discharge machining chips from the machining groove, and a cooling action of the wire electrode in the machining groove can be maintained, thereby enabling to continue stable machining by suppressing wire breakage.

As described above, because the facing length WJ 21 is substantially constant during the cutting process, even in a complicated machining system that simultaneously performs discharge machining in a plurality of parallel wires, a machining state of the wires can be stabilized. Because the machining conditions during steady machining can be maintained constant, the machining gap becomes constant, and a plurality of narrow slits can be simultaneously machined highly accurately.

Because the workpiece 8 fitted in the fitting portion 102 is fixed by the fixing screw 101, positional deviation of the workpiece 8 can be suppressed and destabilization of machining can be suppressed.

The facing length WJ 21 during the cutting process needs only to be substantially constant while the workpiece 8 is actually cut, and the facing length WJ 21 can be changed since start of cutting of the workpiece retainer 10 until reaching the workpiece 8 or after the workpiece 8 has been cut. That is, areas putting the workpiece 8 therebetween in a direction along the wire electrode 2, of the area constituting the external shape of the workpiece retainer 10, can be formed substantially in parallel.

Figures 1, 6:
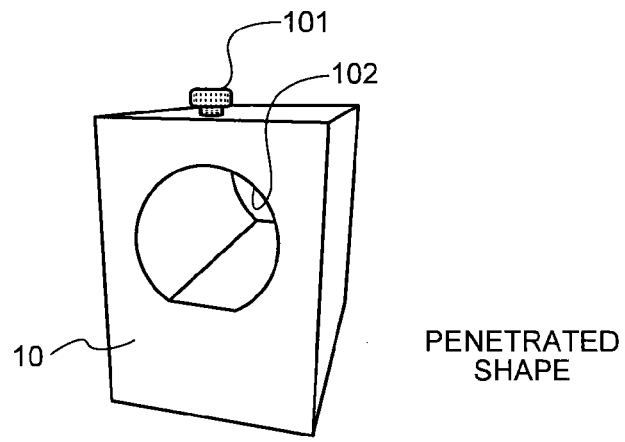
Figures 2, 6:
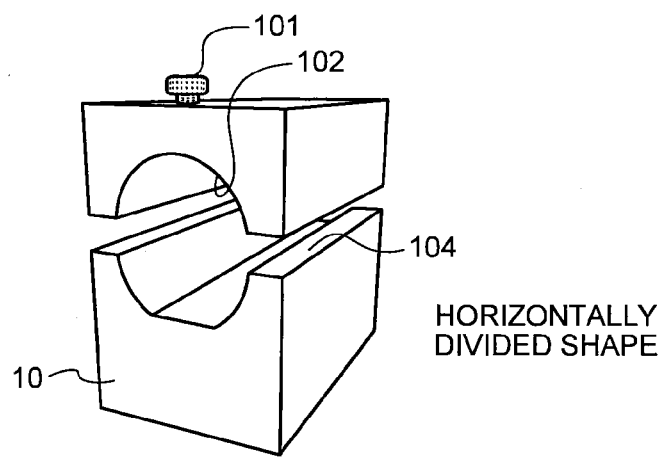
Figures 3, 6:
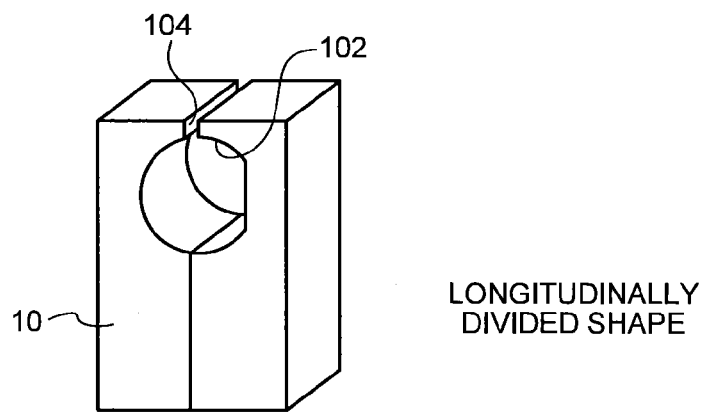

FIG. 6-1 is a perspective view of the workpiece retainer 10 according to a first modification of the first embodiment. In the first modification, the fitting portion 102 is formed in the workpiece retainer 10 as a through hole. Machining at the time of forming the fitting portion 102 in the workpiece retainer 10 can be facilitated by forming the fitting portion 102 as a through hole. By fixing the workpiece 8 by the fixing screw 101, it is possible to prevent that the workpiece 8 falls off from the through hole.

FIG. 6-2 is a perspective view of the workpiece retainer 10 according to a second modification of the first embodiment. In the second modification, the workpiece retainer 10 can be divided at a divided surface 104 formed from the side of the workpiece retainer 10 so as to include the fitting portion 102. Because the fitting portion 102 can be formed in a divided state, the shape accuracy of the fitting portion 102 can be improved. Furthermore, because the workpiece 8 can be retained by putting the workpiece 8 between the divided portions of the workpiece retainer 10, an operation can be facilitated as compared to a case where the workpiece 8 is inserted into the fitting portion 102, which has almost no gap therebetween. While it is preferred that the divided portions in a state of retaining the workpiece 8 have no gap, there can be a gap of about several tens of micrometers, as long as the most part of the workpiece 8 is covered.

FIG. 6-3 is a perspective view of the workpiece retainer 10 according to a third modification of the first embodiment. In the third modification, the workpiece retainer 10 can be divided at the divided surface 104 formed from the top to the bottom of the workpiece retainer 10 so as to include the fitting portion 102. That is, in the third modification, a dividing direction of the workpiece retainer 10 is longitudinal. By setting the dividing direction to the longitudinal direction, the facing length WJ 21 does not need to be constant during the cutting process until the wire electrode 2 reaches the workpiece 8 (from the top to the fitting portion 102 of the divided surface 104). Accordingly, as shown in FIG. 6-3, any problem is unlikely to occur even if a gap of about several millimeters is generated on a matching surface of the divided surface 104. Because the gap between the machining fluid nozzles 80 and the workpiece retainer 10 does not change even if a gap is provided on the matching surface of the divided surface 104, the circulation of the machining fluid is hardly affected. In this manner, by providing the gap on the matching surface of the divided surface 104, an operation of removing the workpiece retainer 10 from the workpiece at the time of completion of machining is facilitated. Because the machining accuracy required for the divided surface 104 is decreased, production cost of the workpiece retainer 10 can be suppressed.

Figures 1, 7:
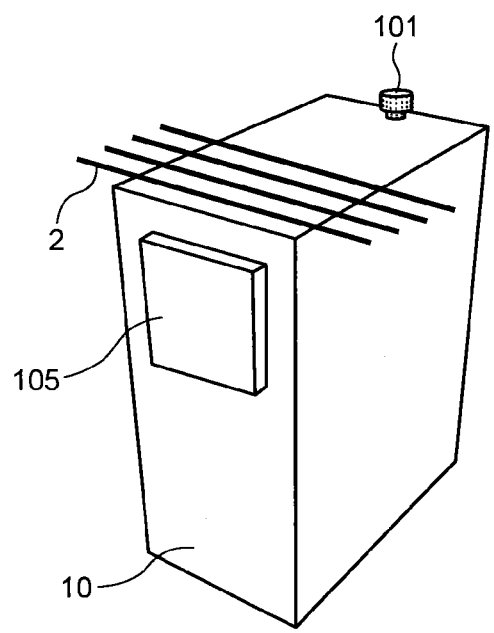
Figures 2, 7:
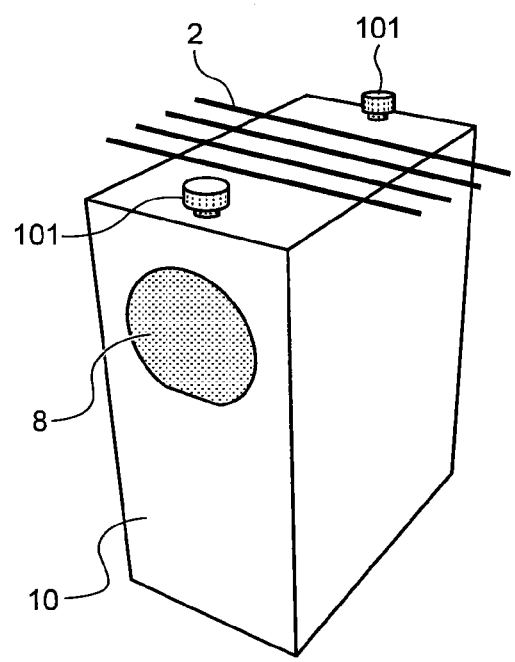

FIG. 7-1 is a perspective view of the workpiece retainer 10, depicting an example of a fall preventing structure of the workpiece 8. The workpiece 8 is fixed by the fixing screw 101 at one end of the fitting portion 102 formed as a through hole and the other side is blocked by a lid 105, thereby enabling to prevent fall of the workpiece 8 after the cutting process. The lid 105 can be attached to the workpiece retainer 10 or can be fixed to the workpiece retainer 10 by a screw or the like.

FIG. 7-2 is a perspective view of the workpiece retainer 10, depicting an example of the fall preventing structure of the workpiece 8. The workpiece 8 is fixed by the fixing screw 101 at opposite ends of the fitting portion 102 formed as through holes, thereby enabling to prevent fall of the workpiece 8 after the cutting process. The fixing screw 101 needs to be provided at positions at which the fixing screws 101 do not interfere with the wire electrode and the like at the time of the cutting process.

Second Embodiment

Figure 8:
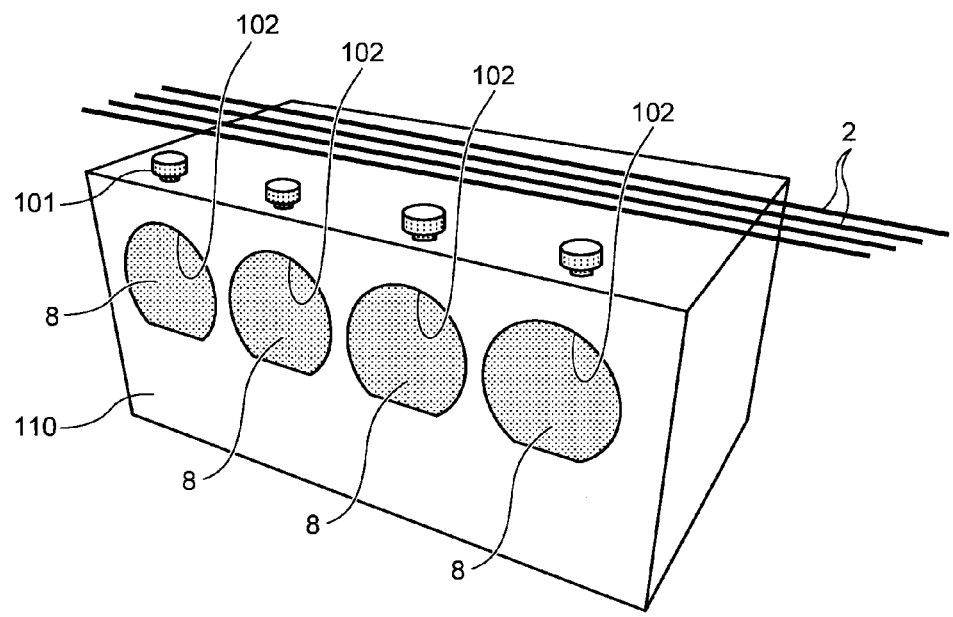
FIG. 8 is a perspective view of a workpiece retainer according to a second embodiment of the present invention.

FIG. 8 is a perspective view of a workpiece retainer according to a second embodiment of the present invention. In the second embodiment, a plurality of fitting portions 102 are formed with respect to one workpiece retainer 110. The fitting portions 102 are formed parallel to the wire electrode 2. The external shape of the workpiece retainer 110 is a cuboid shape as in the first embodiment. According to the workpiece retainer 110, a plurality of workpieces 8 can be machined simultaneously and stably.

Third Embodiment

Figure 9:
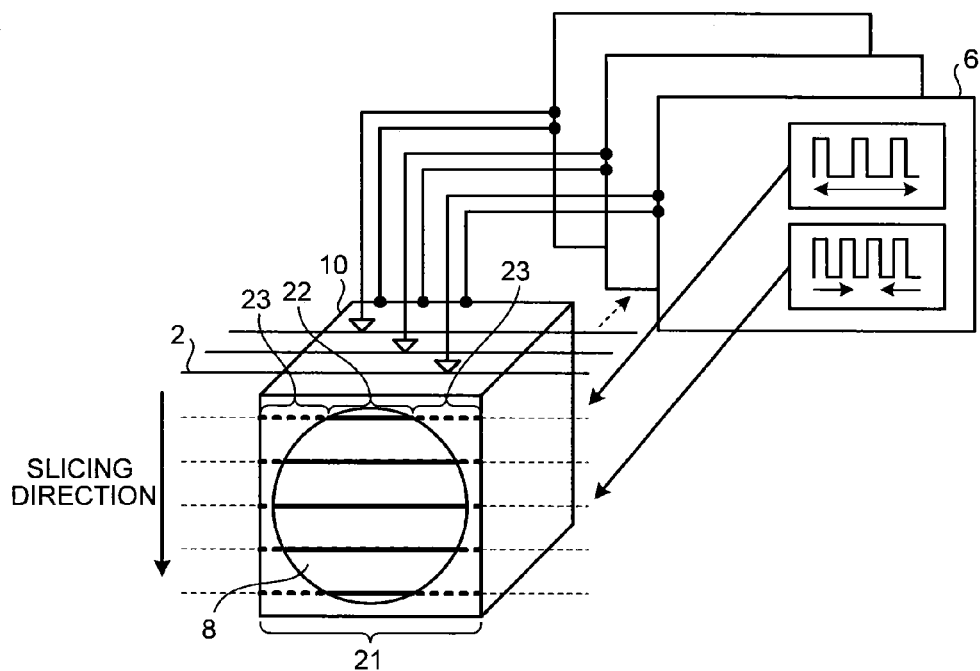
FIG. 9 is a perspective cross section of a relation between a workpiece and a workpiece retainer, and a wire electrode during a cutting process using a workpiece retainer according to a third embodiment of the present invention.

FIG. 9 is a perspective cross section of a relation between a workpiece and a workpiece retainer, and a wire electrode during a cutting process using the workpiece retainer according to a third embodiment of the present invention. To control the machining groove width in a unit of several micrometers and acquire higher accuracy in a machining shape, a machining process needs to be performed in a configuration mode shown in FIG. 9. In the configuration in FIG. 9, the pulse frequency of the machining power supply 6 can be changed according to a facing length W 22 between the wire electrode 2 and the workpiece 8.

When the materials of the workpiece 8 and the workpiece retainer 10 are the same and the facing length WJ 21 during machining is constant, a machining gap between the wire electrode 2 and the workpiece 8 becomes substantially constant, and highly accurate machining can be realized. However, in practice the material of the workpiece 8 is a processing resistant material, and it is general to select an easily obtainable material for the workpiece retainer 10 from a viewpoint of decreasing the production cost.

As a basis of selection of the material of the workpiece retainer 10, it is important to select a material preferably having the same electric discharge machining characteristics (a machining speed) as those of the material of the workpiece 8. However, because the same material cannot be selected, it is difficult to have the same electric discharge machining characteristics.

For example, when the material of the workpiece retainer 10 has better electric discharge machining characteristics than those of the material of the workpiece 8, a change in the facing length W 22 of the remaining workpiece 8 becomes dominant with respect to a machining result. When the shape of the workpiece 8 is cylindrical as shown in the drawings, the facing length W 22 changes according to a machining depth. By increasing the pulse frequency of the machining power supply 6 as the facing length W 22 increases, a constant machining amount is maintained, and the machining gap can be maintained constant.

On the other hand, when the material of the workpiece 8 has better electric discharge machining characteristics than those of the material of the workpiece retainer 10, a change in a facing length J 23 of the remaining workpiece retainer 10 is dominant with respect to the machining result. In this case, when the shape of the workpiece 8 is cylindrical, by decreasing the pulse frequency of the machining power supply 6 as the facing length W 22 increases, the machining gap can be maintained constant.

Generally, however, the easily obtainable material has better electric discharge machining characteristics than those of the material of the workpiece 8, and thus by increasing the pulse frequency of the machining power supply 6 as the facing length W 22 increases, a constant machining amount is maintained and the machining gap can be maintained constant.

Figures 1, 10:
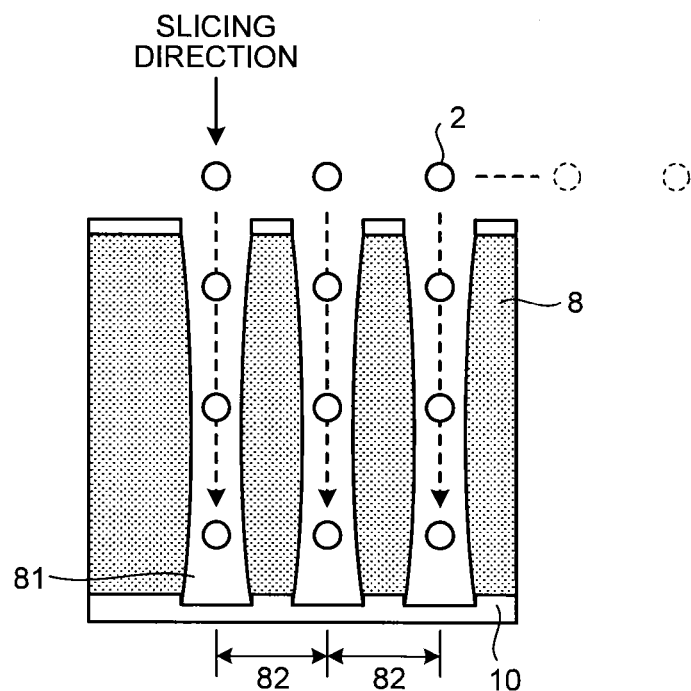
Figures 2, 10:
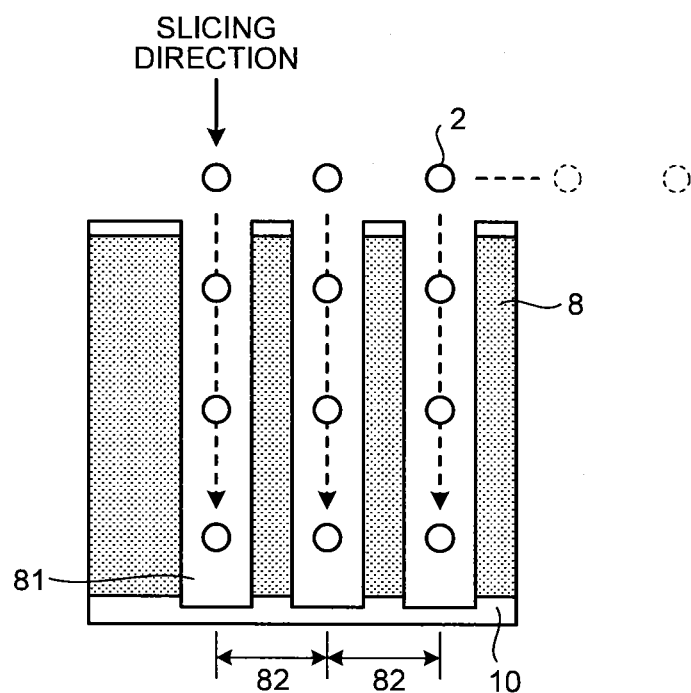

FIGS. 10-1 and 10-2 are horizontal cross sections of a relation between the workpiece 8 and the workpiece retainer 10, and the wire electrode 2 during a cutting process. The workpiece 8 can be stably machined by integrally machining the workpiece 8 and the workpiece retainer 10. However, when the material of the workpiece 8 is a processing resistant material and the material of the workpiece retainer 10 has better electric discharge machining characteristics (a machining speed) than those of the processing resistant material, it is possible to confirm that a shape error of several tens of micrometers or more as shown in FIG. 10-1 has occurred by enlarging the tendency of the shape of the machining groove 81.

As the cause of the shape error, it is conceivable that the machining efficiency decreases as the facing length W 22 between the workpiece 8 and the wire electrode increases, in the facing length WJ 21 between the workpiece retainer 10 including the workpiece 8 and the wire electrode 2, thereby decreasing a substantial machining allowance. Therefore, in the shape of the machining groove 81, the groove width decreases at a position where the facing length W 22 between the workpiece 8 and the wire electrode is large, and the machining efficiency relatively increases and the groove width increases at a position where the facing length W 22 of the workpiece 8 and the wire electrode is small.

FIG. 10-2 depicts a shape of the machining groove when the frequency is changed according to the facing length W 22 between the workpiece 8 and the wire electrode 2. The pulse frequency is increased at a position where the facing length W 22 is large, and the pulse frequency is decreased at a position where the facing length W 22 is small, thereby enabling to maintain the machining efficiency, regardless of the machining depth, and to equalize the machining groove width.

When the material of the workpiece 8 has better electric discharge machining characteristics (a machining speed than those of the material of the workpiece retainer 10, the tendency of the groove shape shown in FIG. 10-1 is inverted, and the central part thereof tends to expand. Also in the control for maintaining the groove width, the pulse frequency is decreased at a position where the facing length W 22 is large and the pulse frequency is increased at a position where the facing length W 22 is small, thereby enabling to maintain the machining efficiency regardless of the machining depth, and to equalize the machining groove width.

Figure 11:
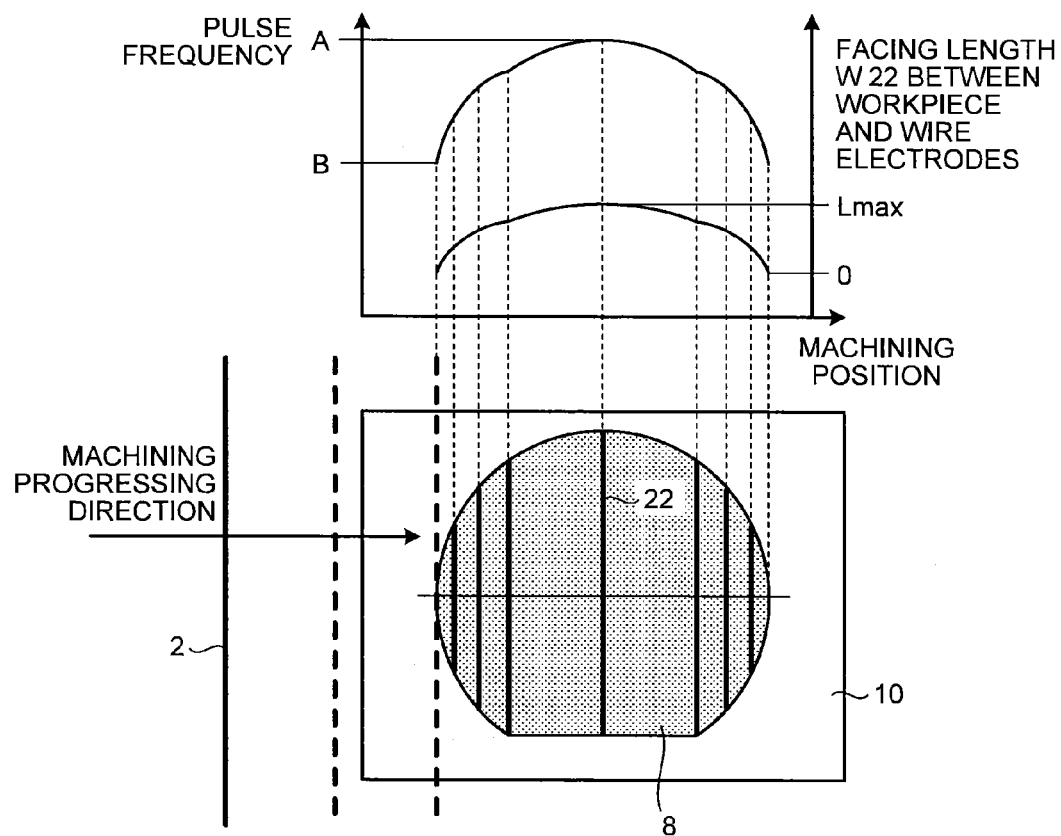
FIG. 11 depicts a transition of a facing length W between a workpiece and a wire electrode, which changes according to a machining progressing position, and of a pulse frequency of a machining power supply controlled according to the facing length W.

FIG. 11 depicts a transition of the facing length W 22 between the workpiece 8 and the wire electrode 2, which changes according to a machining progressing position, and of a pulse frequency of the machining power supply 6 controlled according to the facing length W 22. FIG. 11 depicts a case where machining progresses in a direction shown by an arrow. Furthermore, a case where the material of the workpiece 8 is a processing resistant material and the electric discharge machining characteristics (a machining speed) of the material of the workpiece retainer 10 are better than those of the material of the workpiece 8 is shown.

It is assumed that a maximum value A and a minimum value B of the pulse frequency have been acquired in advance by basic experiments. When the facing length W 22 between the workpiece 8 and the wire electrode 2 at the time of machining the workpiece 8 is the largest, the largest pulse frequency that does not cause wire breakage is generally selected for the frequency A. The machining gap at that time is assumed to be "a".

Such a frequency that the machining gap becomes "a" at the time of machining the workpiece retainer 10 is selected for the pulse frequency B. Under the same machining conditions, the machining gap at the time of machining the workpiece retainer 10 is larger than that at the time of machining the workpiece 8, and thus the pulse frequency B generally needs to be set smaller than the pulse frequency A.

The facing length W 22 between the workpiece 8 and the wire electrode 2 changes according to the machining progressing position. However, when the cross sectional shape of the workpiece 8 is ascertained, the facing length W 22 can be calculated in advance. When it is assumed that the maximum value of the facing length W 22 between the workpiece 8 and the wire electrode 2 is Lmax, the pulse frequency corresponding to the facing length L is calculated based on the following equation (1).

$$\text{Pulse frequency} = B + (A-B)L/L\text{max} \tag{1}$$

The pulse frequency can be calculated before machining, or calculated during machining. For example, the calculated pulse frequency is stored in a storage unit 50 shown in FIG. 1. A control unit 51 changes the pulse frequency of the machining voltage based on the calculated pulse frequency. While it is preferred to change the pulse frequency quickly corresponding to a change in the facing length W 22, the pulse frequency can be changed in a stepwise manner to simplify a control configuration. A wire feed rate at the time of machining the workpiece 8 is generally controlled to be constant.

The configuration can be such that in a section from start of a cutting process until machining is stabilized, the control unit 51 gradually increases the pulse frequency and the feed rate of the wire electrode 2 in a state where a ratio between the pulse frequency and the feed rate of the wire electrode 2 is maintained. In this case, the control unit 51 functions as an increasing unit that increases the pulse frequency and the feed rate of the wire electrode 2.

Figure 12:
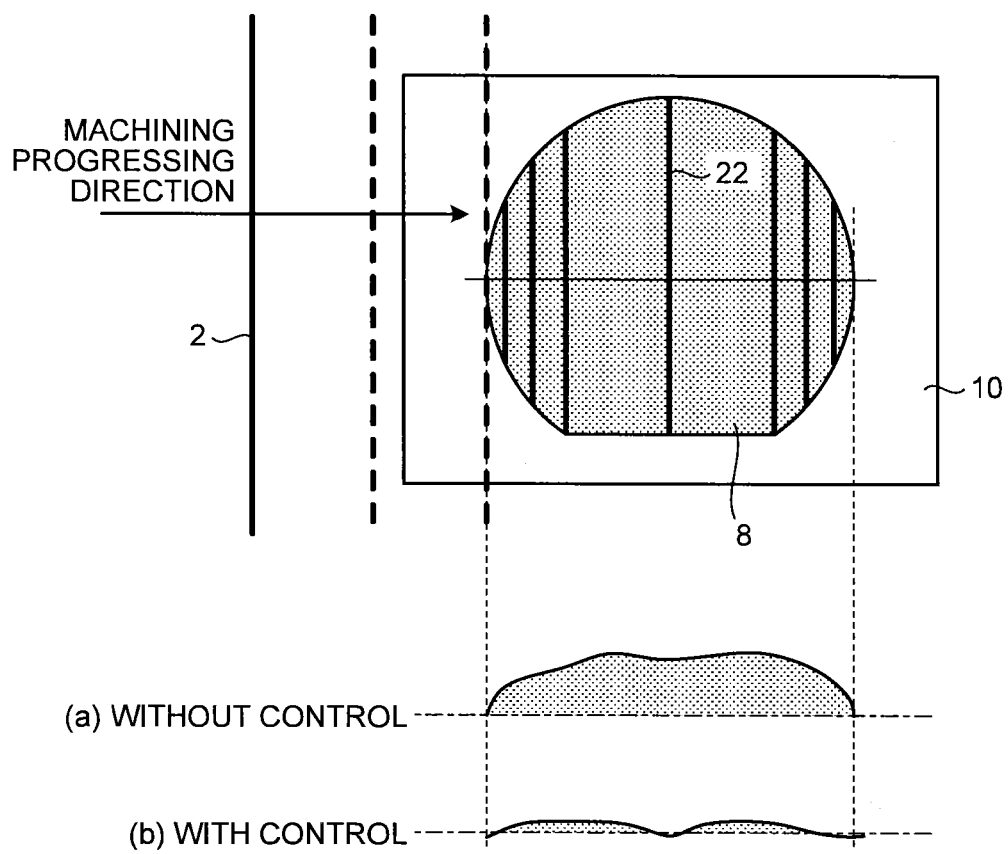
FIG. 12 depicts a cross sectional shape of a sliced workpiece, and is an explanatory diagram of a difference in a cross sectional shape whether there is a control of a pulse frequency.

FIG. 12 depicts a cross sectional shape of the workpiece 8 sliced by the control shown in FIG. 11. When the pulse frequency is not controlled, as shown in (a) in FIG. 12, the cross sectional shape has a tendency such that a central part rises. On the other hand, by controlling the pulse frequency, the flatness of the cross sectional shape can be improved as shown in (b) in FIG. 12.

INDUSTRIAL APPLICABILITY

As described above, the workpiece retainer, the wire electric discharge machining device, the thin-plate manufacturing method, and the semiconductor-wafer manufacturing method according to the present invention are useful for realizing highly accurate groove machining in a multi-parallel manner.

REFERENCE SIGNS LIST

1 wire bobbin
2 wire electrode
2a cutting wire portion
3a to 3d guide roller
5 wire discharge roller
6 machining power supply
7A, 7B power feed contact
8 workpiece
8a notch
10 workpiece retainer
21 facing length WJ
22 facing length W
23 facing length J
50 storage unit
51 control unit
61 machining power-supply unit
71 power feed contact unit
80 machining fluid nozzle
81 machining groove
82 machining pitch width
101 fixing screw
102 fitting portion
104 divided surface
105 lid
110 workpiece retainer
A pulse frequency
B pulse frequency
Lmax facing length

The invention claimed is:

1. A thin-plate manufacturing method comprising:
fixing a workpiece to a workpiece retainer formed of a material having electric discharge machining characteristics different from those of the material of the workpiece, wherein a length of a portion where the workpiece faces the wire electrodes, such that the wire electrodes extending in a cutting direction are able to cut the facing portion of the workpiece, changes with progress of a cutting process of the workpiece;
cutting the facing portion of the workpiece and the workpiece retainer using a wire electric discharge machining device that cuts by electric discharge from wire electrodes that are spaced from each other and are arranged in parallel, and by applying a pulsed machining voltage between the wire electrodes and the workpiece retainer to each of the wire electrodes, and supplying machining fluid to a machining groove using a machining fluid nozzle,
wherein the workpiece retainer is formed with a fitting portion comprising a cavity into which the workpiece is fitted, a cross sectional shape of the workpiece and a cross sectional shape of the cavity of the fitting portion in the retainer, both cross sectional shapes being viewed perpendicular to a plane containing the cutting direction, are substantially the same, and the workpiece retainer has an external shape such that at a time of cutting the workpiece fitted in the fitting portion together with the workpiece retainer a length along the wire electrodes of a portion where the workpiece retainer and the workpiece face the wire electrodes is substantially constant during a cutting process of the workpiece;
changing a pulse frequency of the pulsed machining voltage during the cutting process according to the length of the portion of the workpiece where the workpiece faces the wire electrodes, such that an electric discharge machining gap is maintained constant during the cutting process; and
gradually increasing the pulse frequency and a feed rate of wire electrodes in a section from a start of a cutting process until machining is stabilized, in a state where a ratio between the pulse frequency and the feed rate of the wire electrodes is maintained.

2. The thin-plate manufacturing method according to claim 1, further comprising:
increasing the pulse frequency of the pulsed machining voltage when the length of the portion where the workpiece faces the wire electrodes increases.

3. The thin-plate manufacturing method according to claim 2, wherein the material of the workpiece retainer has better electric discharge machining characteristics than those of the material of the workpiece.

* * * * *